US011969013B2

(12) United States Patent
Li et al.

(10) Patent No.: US 11,969,013 B2
(45) Date of Patent: Apr. 30, 2024

(54) ELECTRONIC CIGARETTE, ATOMIZING ASSEMBLY, AND ATOMIZING COMPONENT FOR SAME

(71) Applicant: Shenzhen Smoore Technology Limited, Shenzhen (CN)

(72) Inventors: Pei Li, Shenzhen (CN); Hongxia Lv, Shenzhen (CN); Heng Zhang, Shenzhen (CN); Zhenlong Jiang, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 612 days.

(21) Appl. No.: 17/168,184

(22) Filed: Feb. 5, 2021

(65) Prior Publication Data

US 2021/0161207 A1 Jun. 3, 2021

Related U.S. Application Data

(63) Continuation of application No. PCT/CN2018/104895, filed on Sep. 10, 2018.

(51) Int. Cl.

| | |
|---|---|
| ***A24F 40/46*** | (2020.01) |
| ***A24F 40/10*** | (2020.01) |
| ***H05B 3/12*** | (2006.01) |

(52) U.S. Cl.

CPC .............. *A24F 40/46* (2020.01); *A24F 40/10* (2020.01); *H05B 3/12* (2013.01); *H05B 2203/013* (2013.01); *H05B 2203/021* (2013.01)

(58) Field of Classification Search

CPC ........... A24F 40/46; A24F 40/10; H05B 3/12; H05B 2203/013; H05B 2203/021; H05B 3/143; H05B 3/10

See application file for complete search history.

(56) References Cited

FOREIGN PATENT DOCUMENTS

| | | | | | |
|---|---|---|---|---|---|
| CA | 3014136 | A1 | | 12/2017 | |
| CA | 3028935 | A1 | | 1/2018 | |
| CN | 103932401 | A | | 7/2014 | |
| CN | 103960782 | A | | 8/2014 | |
| CN | 203841119 | U | | 9/2014 | |
| CN | 104983079 | A | | 10/2015 | |
| CN | 205337599 | U | | 6/2016 | |
| CN | 105755434 | A | | 7/2016 | |
| CN | 106579564 | A | * | 4/2017 | ........... A24F 47/008 |
| CN | 106579564 | A | | 4/2017 | |

(Continued)

OTHER PUBLICATIONS

Second Office Action from China patent office in a counterpart Chinese Patent application No. 201880001973.3 dated Apr. 28, 2021 (12 pages).

(Continued)

*Primary Examiner* — Jean F Duverne

(57) ABSTRACT

An electronic cigarette, an atomization assembly and an atomization component for the same. The atomization component comprises a porous base, a first film, and a second film. The porous base material comprises an atomization surface. The first film and the second film are sequentially formed on the atomization surface. At least one of the first film or the second film is used for generating heat when charged, so as to heat and atomize an e-liquid on the atomization surface.

21 Claims, 5 Drawing Sheets

(56) References Cited

FOREIGN PATENT DOCUMENTS

| | | | | |
|---|---|---|---|---|
| CN | 206197010 U | | 5/2017 | |
| CN | 108968159 A | | 12/2018 | |
| EP | 3023510 A1 | * | 5/2016 | ........... C23C 28/324 |
| WO | WO2017066955 A1 | | 4/2017 | |

OTHER PUBLICATIONS

European Search report, application No. 18933420.4, dated Aug. 24, 2021 (7 pages).
Europe examination report, Application No. 18933420.4, dated Sep. 12, 2022.
Rejection decision from China patenr office in a counterpart Chinese Patent application No. 201880001973.3 dated Aug. 31 (18 pages).
Written Opinion of the International Search Authority, PCT/CN2018/104895 dated Jun. 3, 2019 (4 pages).
First Office Action from China patent office in a counterpart Chinese Patent application No. 201880001973.3 dated Sep. 16, 2020 (27 pages).
International Search Report, application No. PCT/CN2018/104895, dated Sep. 3, 2019 (7pages).
Chinese Review Decision Letter, Chinese Application No. 201880001973.3, dated Jun. 26, 2023 (21 pages).

* cited by examiner

ELECTRONIC CIGARETTE, ATOMIZING ASSEMBLY, AND ATOMIZING COMPONENT FOR SAME

CROSS-REFERENCE TO RELATED APPLICATIONS

The present disclosure is a continuation-application of International (PCT) Patent Application No. PCT/CN2018/104895 filed Sep. 10, 2018 in the China National Intellectual Property Administration, the contents of all of which are hereby incorporated by reference.

TECHNICAL FIELD

The present disclosure relates to electronic cigarettes, and in particular to an electronic cigarette, an atomizing assembly and an atomizing component for same.

BACKGROUND

People care more and more about their health. Harm from traditional tobacco to the human body has been noticed. Thus, electronic cigarettes have been invented. An electronic cigarette has a similar appearance and smell as a traditional cigarette, but usually does not contain harmful ingredients such as tar, harmful aerosol, etc. Accordingly, harm from the electronic cigarette to the user is much less than that of the traditional cigarette. The electronic cigarette may be used to replace the traditional cigarette and help users quit smoking.

An electronic cigarette is usually composed of an atomizer and a battery assembly. In the related art, a heating body of the atomizer of the electronic cigarette is usually a spring-shaped heating wire. The heating body is made by winding a linear heating wire on a fixed shaft. When the heating wire is electrified, e-liquid stored in a storage medium is adsorbed on the fixed shaft, and the e-liquid is heated and then atomized by the heating wire. Because the heating wire is linear, only the e-liquid near the heating wire body can be heated to atomize. Although the e-liquid far away from the heating wire body can atomize, atomized particles will be larger due to the lower atomizing temperature, which will affect the taste of the electronic cigarette.

SUMMARY

The invention provides an electronic cigarette, an atomizing assembly and an atomizing component for same.

In order to solve the above technical problems, a technical solution adopted by the invention is to provide an atomizing component for an electronic cigarette. The atomizing component includes a porous base, a first film and a second film. The porous base has an atomization surface. The first film and the second film are sequentially formed on the atomization surface. At least one of the first film and the second film is configured to generate heat when being charged to heat and atomize an e-liquid on the atomization surface.

Alternatively, a coefficient of thermal expansion of the second film is greater than a coefficient of thermal expansion of the first film, and the coefficient of thermal expansion of the first film is greater than a coefficient of thermal expansion of the porous base.

Alternatively, an antioxidant capacity of the second film is stronger than an antioxidant capacity of the first film.

Alternatively, the atomizing component further includes a thermal isolation layer formed between the first film and the porous base. The thermal isolation layer is configured to protect the porous base.

Alternatively, the porous base is made of a conductive material, and the atomizing component further includes an insulating layer formed between the first film and the porous base. The insulating layer is configured to insulate the porous base from the first film.

Alternatively, a porosity of the porous base ranges from 30% to 70%.

Alternatively, pore diameters of micropores on the porous base range from 1 μm to 100 μm.

Alternatively, an average pore diameter of micropores on the porous base ranges from 10 μm to 35 μm.

Alternatively, a volume of micropores with pore diameters of 5-30 μm on the porous base accounts for more than 60% of a volume of all micropores on the porous base.

Alternatively, the first film and the second film are both porous films.

Alternatively, a material of the first film is selected from a group of titanium, zirconium, titanium aluminum alloy, titanium zirconium alloy, titanium molybdenum alloy, titanium niobium alloy, iron aluminum alloy and tantalum aluminum alloy.

Alternatively, the first film is made of titanium zirconium alloy, and a thickness of the first film ranges from 0.5 μm to 5 μm.

Alternatively, in the titanium zirconium alloy, a proportion of zirconium in the total mass ranges from 30% to 70%.

Alternatively, a material of the second film is selected from a group of platinum, palladium, palladium copper alloy, gold silver platinum alloy, gold silver alloy, palladium silver alloy and gold platinum alloy.

Alternatively, the second film is made of gold silver alloy, and a thickness of the second film ranges from 0.1 μm to 1 μm.

Alternatively, in the gold silver alloy, an atomic ratio of gold to silver ranges from 30% to 70%.

Alternatively, a thickness of the first film ranges from 1 μm to 2 μm, and a thickness of the second film ranges from 0.1 μm to 0.2 μm.

Alternatively, a thickness of the first film ranges from 0.5 μm to 1 μm, and a thickness of the second film ranges from 0.3 μm to 1 μm.

Alternatively, the atomizing component further includes an electrode formed on a side of the second film away from the first film.

To solve the above-mentioned problem, a technical scheme adopted by the present disclosure is to provide an atomizing component. The atomizing component includes a porous base having an atomization surface, a first film formed on the atomization surface and a second film formed on the first film. At least one of the first film and the second film is configured to generate heat when being charged.

To solve the above-mentioned problem, a technical scheme adopted by the present disclosure is to provide an atomizing assembly of an electronic cigarette. The atomizing assembly includes a liquid storage cavity for storing e-liquid and any atomizing component described above. The e-liquid in the liquid storage cavity is capable of being transported to the atomization surface.

In order to solve the above technical problem, another technical solution adopted by the invention is to provide an electronic cigarette. The electronic cigarette includes a battery assembly and any atomizing assembly described above. The battery assembly is electrically connected with the atomizing assembly to power the atomizing component of the atomizing assembly.

BRIEF DESCRIPTION OF THE DRAWINGS

In order to make the technical solution described in the embodiments of the present disclosure more clear, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by those skilled in the art based on the embodiments of the present disclosure without creative efforts shall fall within the protection scope of the present disclosure.

Figure 1:
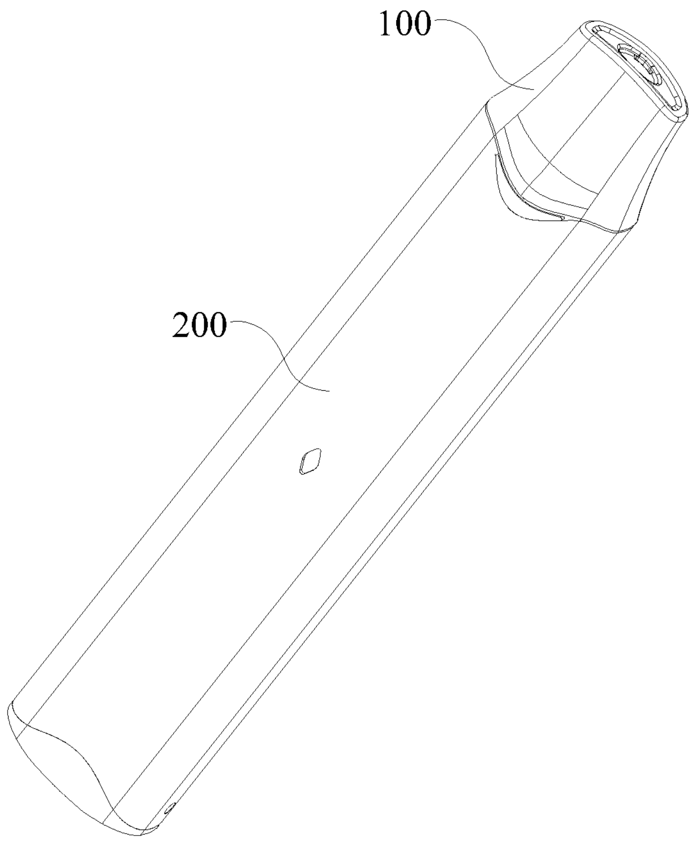
FIG. 1 is a perspective view of an electronic cigarette according to an embodiment of the present disclosure.

Referring to FIG. 1, an electronic cigarette of the present disclosure includes an atomizing assembly 100 and a battery assembly 200. The battery assembly 200 is electrically connected with the atomizing assembly 100 to power the atomizing assembly 100.

In the embodiment, the battery assembly 200 may be detachably connected with the atomizing assembly 100. Any of the components (the battery assembly 200 and the atomizing assembly 100) can be replaced when damaged. In other embodiments, the battery assembly 200 and the atomizing assembly 100 can also be accommodated in a same shell to make the electronic cigarette an integrated structure which is more convenient to be carried. Connection modes between the battery assembly 200 and the atomizing assembly 100 are not specifically limited in the embodiment of the present disclosure.

Figure 2:
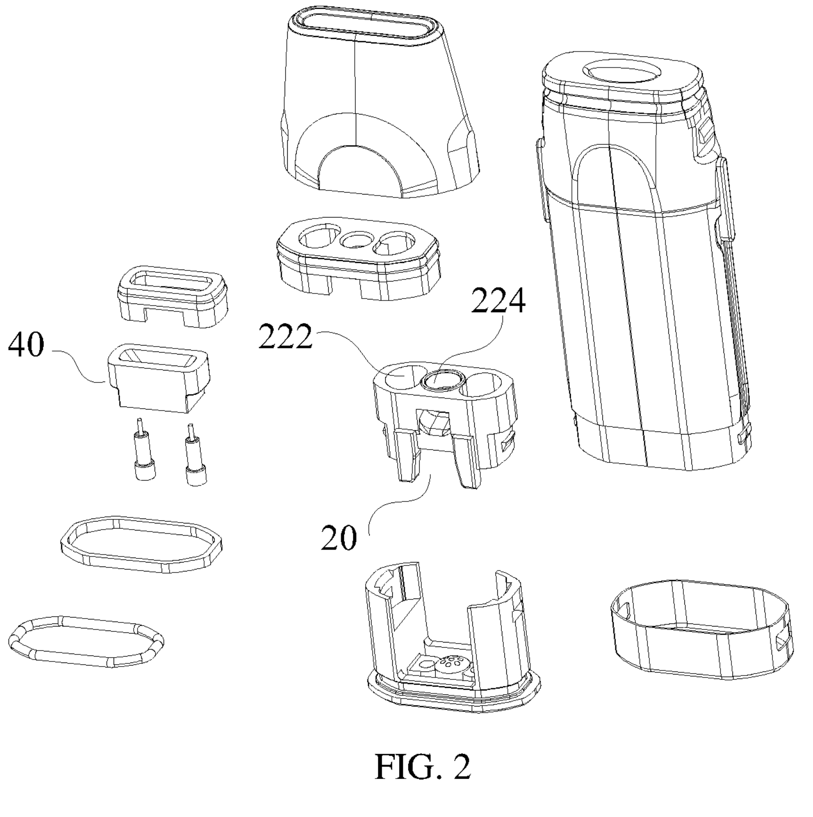
FIG. 2 is an exploded view of an atomizing assembly of the electronic cigarette shown in FIG. 1.
Figure 3:
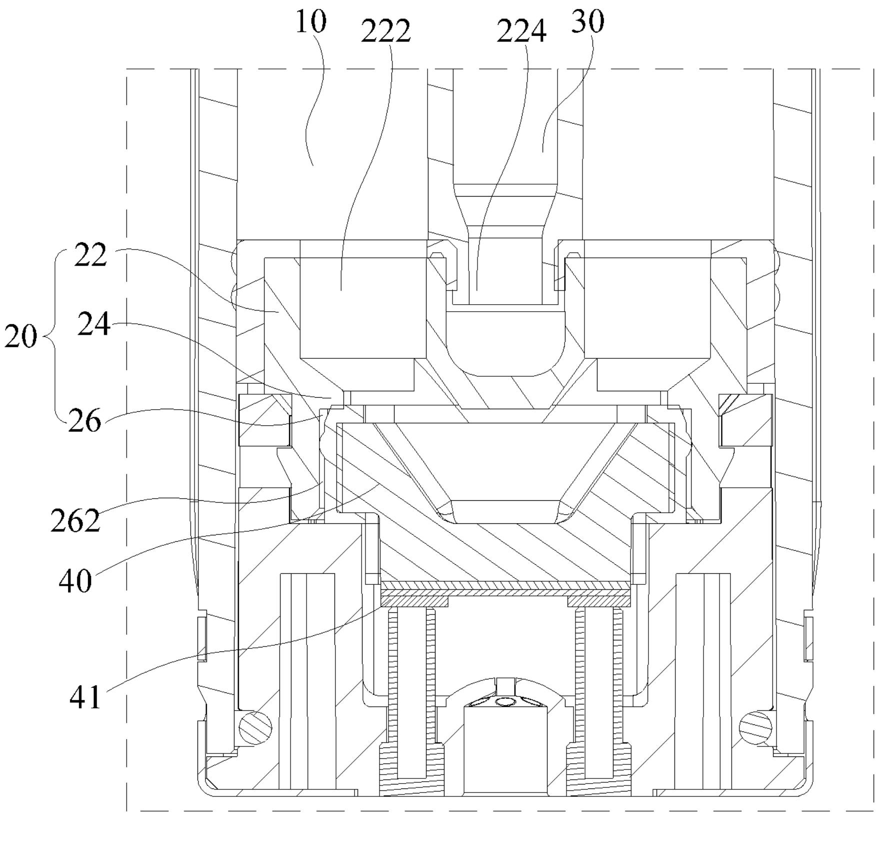
FIG. 3 is a cross-sectional view and a partial enlarged view of the atomizing assembly shown in FIG. 2.

Referring to FIG. 2 and FIG. 3, the atomizing assembly 100 includes a liquid storage cavity 10, an upper cover 20, a smoke tunnel 30, and an atomizing component 40. The atomizing component 40 is arranged in the upper cover 20, the upper cover 20 may be configured to transport e-liquid from the liquid storage cavity 10 to the atomizing component 40. The smoke tunnel 30 may be connected with an atomization surface of the atomizing component 40 to transmit atomized smoke.

Specifically, in the present embodiment, the upper cover 20 includes a guiding member 22, a matching member 24 and an accommodating member 26. The guiding member 22, the matching member 24 and the accommodating member 26 are sequentially connected. The guiding member 22 may be provided with a liquid inlet hole 222 and a smoke outlet hole 224. The liquid inlet hole 222 may be communicated with the liquid storage cavity 10. The smoke outlet hole 224 may be communicated with the smoke tunnel 30. The accommodating member 26 may define an accommodating cavity 262 for accommodating the atomizing component 40. The matching member 24 may be configured to communicate the guiding member 22 with the accommodating member 26 to transport the e-liquid in the liquid inlet hole 222 to the atomizing component 40.

The atomizing component 40 may be configured to convert transported e-liquid into smoke by heating. The smoke outlet 224 may be in fluid communication with the atomization surface of the atomizing component 40, the e-liquid may be heated on the atomization surface and atomized into smoke, and the smoke may be transported from the smoke outlet 224 through the smoke tunnel 30.

In the embodiment, referring to FIG. 2 and FIG. 3, the upper cover 20 may be an integral structure. Specifically, the liquid inlet hole 222 and the smoke outlet hole 224 are respectively arranged on a surface of the upper cover 20 facing towards the liquid storage cavity 10. An opening of the accommodating cavity 262 may formed on a surface of the accommodating member 26 away from the liquid storage cavity 10. Finally, a through hole may be opened on the matching member 24 to communicate the liquid inlet hole 222 and the accommodating cavity 262. In alternative embodiments, the guiding member 22, the matching member 24 and the accommodating member 26 can also be machined on the upper cover 20 by other processing sequences or methods, and there is no specific limitation here.

By adopting an integral structure of the guiding member 22, the matching member 24 and the accommodating member 26, the number of components of the atomizing assembly 100 can be reduced. Thus, it is more convenient to install the components and related sealing performance may be better.

Figure 4:
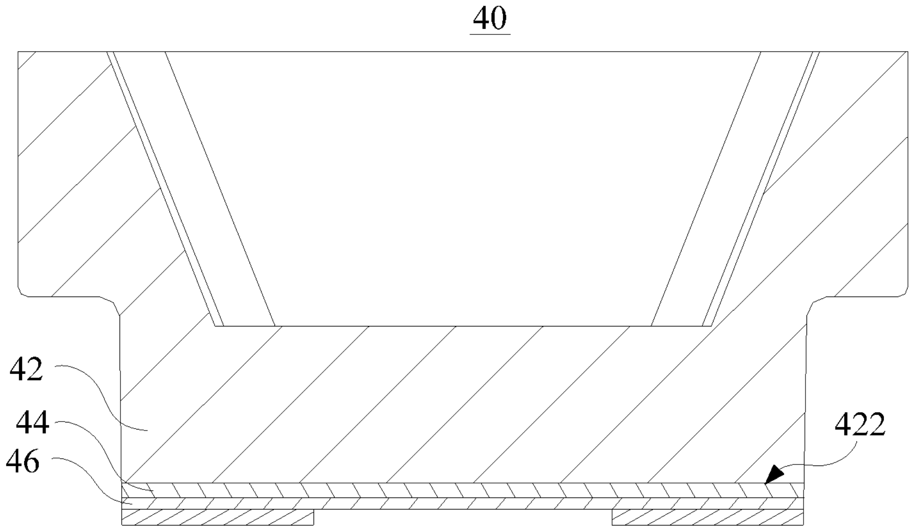
FIG. 4 is a plane structural diagram of an atomizing component according to an embodiment of the present disclosure.

Referring to FIG. 4, the atomizing component 40 includes a porous base 42, a first film 44 and a second film 46. The porous base 42 includes an atomization surface 422. The first film 44 and the second film 46 are sequentially formed on the atomization surface 422. That is, the first film 44 is formed on the atomization surface 422 and the second film 46 is formed on the first film 44. The e-liquid in the liquid storage cavity 10 is transported to the porous base 42 through the upper cover 20, and the porous base 42 further transports the e-liquid to the atomization surface 422. Therefore, when at least one of the first film 44 and the second film 46 is charged to generate heat, the e-liquid on the atomization surface 422 can be heated to atomize into smoke.

In some embodiments, the porous base 42 is made of porous structural materials. Specifically, the porous base 42 may be a porous ceramic, a porous glass, a porous plastic, a porous metal, and the like. Materials of the porous base 42 are not specifically defined in the present disclosure.

Figure 5:
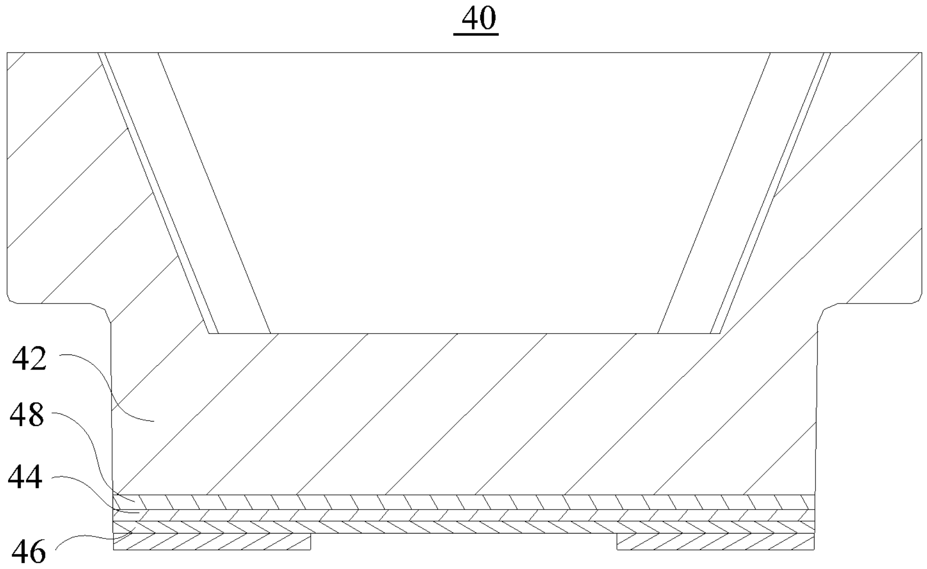
FIG. 5 is a plane structural diagram of an atomizing component according to another embodiment of the present disclosure.

In one embodiment, the porous base 42 may be made of a material with lower temperature resistance, for example, a porous plastic. Under these circumstances, the atomizing component 40 can also include a thermal isolation layer 48, as shown in FIG. 5. The thermal isolation layer 48 is formed between the first film 44 and the porous base 42. That is, the thermal isolation layer 48 is sandwiched between the atomization surface 422 and the first film 44 to protect the porous base 42 and prevent the first film 44 from damaging the porous base 42 during heating.

Figure 6:
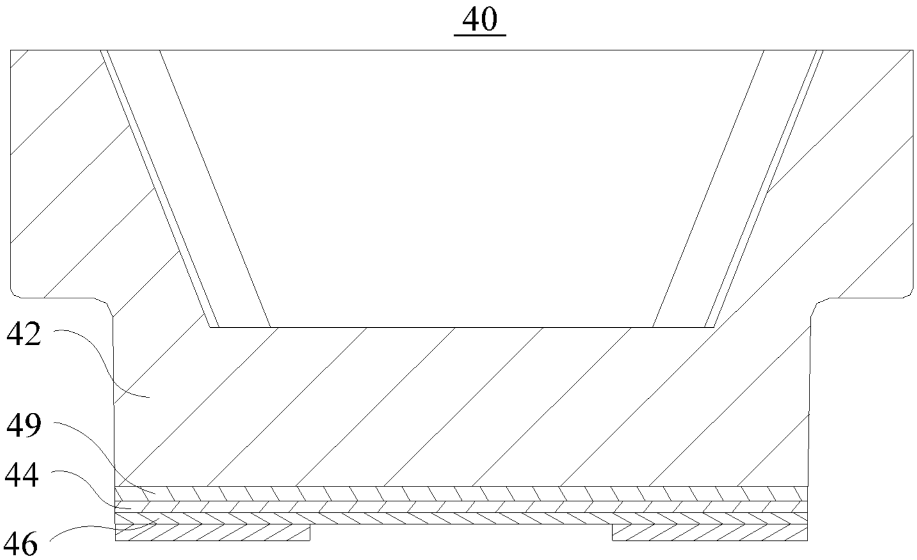
FIG. 6 is a plane structural diagram of an atomizing component according to another embodiment of the present disclosure.

In another embodiment, the porous base 42 may be made of a conductive material with a conductive function, such as a porous metal. Under these circumstances, the atomizing component 40 can also include an insulating layer 49, as shown in FIG. 6. The insulating layer 49 is formed between the first film 44 and the porous base 42. That is, the insulating layer 49 is sandwiched between the atomization surface 422 and the first film 44 to insulate the porous base 42 from the first film 44 and prevent a short circuit caused by the electrical connection between the porous base 42 and the first film 44.

The insulating layer 49 may be formed by coating an insulating material on the atomization surface 422, or by oxidizing the surface of the porous base 42 so that the insulating layer 49 is uniformly adhered on an outer surface of the porous base 42. In alternative embodiments, other means can be used to form the insulating layer 49 on the atomization surface 422 of the porous base 42, which are not specifically defined in the present disclosure.

Porous ceramics have stable chemical properties and will not react with the e-liquid. The porous ceramics can resist high temperature and will not deform due to too high heating temperature. The porous ceramics are an insulator and will not be electrically connected with the first film 44 formed thereon and will not cause a short circuit. The porous ceramics are easy to manufacture and the cost of the porous ceramics is low. Therefore, in the embodiment, the porous ceramics are selected to make porous base 42.

A porosity of the porous ceramics ranges from 30% to 70%. The porosity refers to a ratio of a total volume of tiny voids in a porous medium to a total volume of the porous medium. A value of the porosity can be adjusted according to a composition of the e-liquid. For example, when a viscosity of the e-liquid is high, a greater porosity is selected to ensure a liquid guiding effect.

In the embodiment, the porosity of the porous ceramics may range from 50% to 60%. By controlling the porosity of the porous ceramics in the range of 50% to 60%, on the one hand, a better liquid guiding efficiency of the porous ceramics can be ensured, the phenomenon of dry burning due to poor flow of liquid can be prevented, and atomization effects can be improved. On the other hand, the porous ceramics guide the e-liquid too fast, which is difficult to lock the e-liquid, resulting in a great increase in e-liquid leakage probability can be avoided.

Further, in the embodiment, pore diameters of micropores on the porous ceramics range from 1 μm to 100 μm.

Alternatively, an average pore diameter of the micropores on the porous ceramics ranges from 10 μm to 35 μm.

In the embodiment, the average pore diameter of the micropores on the porous ceramics ranges from 20 μm to 25 μm.

Alternatively, the most probable pore diameters of the porous ceramics may range from 10 μm to 15 μm. The most probable pore diameters refer to the maximum probability of micropores in the porous ceramics with pore diameters in the range of 10 μm to 15 μm.

Alternatively, a volume of micropores with pore diameters in the range of 5 μm to 30 μm on the porous ceramics accounts for more than 60% of a volume of all micropores on the porous base 42.

Alternatively, the volume of micropores with pore diameters in the range of 10 μm to 15 μm on porous ceramics accounts for more than 20% of the volume of all micropores on the porous ceramics. The volume of micropores with pore diameters in the range of 30 μm to 50 μm in porous ceramics accounts for about 30% of the volume of all micropores on the porous ceramics.

In the above alternative embodiments, by setting the pore diameters of micropores with appropriate sizes and uniform distribution, the liquid guiding performance of the porous ceramics can be uniform and the atomization effect is better.

In other embodiments, when the porous base 42 is made of other porous structural materials, a porosity ratio in the porous base 42 or the pore diameters of the micropores can be set with reference to setting form on the porous ceramics, which will not be repeated here.

Furthermore, in the embodiment, both the first film 44 and the second film 46 are porous films. The first film 44 and the second film 46 may be formed on the porous ceramics by physical vapor deposition or the like. For example, the first film 44 may be formed on the atomization surface 422 of the porous ceramics by evaporation or sputtering, and the second film 46 may be formed on the first film 44 by evaporation or sputtering.

In the embodiment, a coefficient of thermal expansion of the material used for making the second film 46 is greater than a coefficient of thermal expansion of the material used for making the first film 44, and the coefficient of thermal expansion of the material used for making the first film 44 is greater than a coefficient of thermal expansion of the porous base 42 such as the porous ceramics. By setting a coefficient of thermal expansion of the first film 44 between a coefficient of thermal expansion of the porous ceramics and a coefficient of thermal expansion of the second film 46, the second film 46 can match better with the porous ceramics, higher adhesion and stronger thermal shock resistance.

In the embodiment, an antioxidant capacity of the second film 46 is stronger than an antioxidant capacity of the first film 44. Due to high-temperature sintering process (above 300° C.) in the process of preparing electrodes of the atomizing component, when the antioxidant capacity of the first film 44 is poor, the first film 44 will undergo violent oxidation reactions under the action of high temperature, resulting in resistance mutation of the first film 44. By setting the second film 46 with stronger antioxidant capacity on a surface of the first film 44, an oxidation reaction caused by contact of the first film 44 with air can be avoided.

The first film 44 may be metal or alloy. In order to improve the adhesion between the first film 44 and the porous base 42, a material of the first film 44 can be selected as the material with stable adhesion with the porous base 42. For example, when the porous base 42 is the porous ceramics, the first film 44 may be selected from the group of titanium, zirconium, titanium aluminum alloy, titanium zirconium alloy, titanium molybdenum alloy, titanium niobium alloy, iron aluminum alloy and tantalum aluminum alloy.

Titanium and zirconium have the following characteristics.

(1) Titanium and zirconium are biocompatible metals. In particular, titanium is a biophilic metal element with higher safety.

(2) Titanium and zirconium have higher resistivity in metal materials. At room temperature, titanium zirconium alloy prepared according to a certain proportion has three times of original resistivity and is more suitable for heating film materials.

(3) Titanium and zirconium have lower coefficient of thermal expansion and better thermal matching with porous ceramics. Melting point of the alloy prepared according to a certain proportion is lower. Film forming property of magnetron sputtering is better.

(4) After plating a metal film, a result of an electron microscope analysis shows that micro particles of the metal film are spherical, and particles form a micro morphology similar to cauliflower. A result of an electron microscope analysis shows that micro particles of the film formed by titanium zirconium alloy is flake, and some grain boundaries between particles disappear to make continuity better.

(5) Both Titanium and zirconium have good plasticity and elongation, and a titanium zirconium alloy film has better thermal cycling resistance and current impact resistance.

(6) Titanium is often used as a stress buffer layer between a metal and a ceramic and an active element of ceramic metallization. Titanium can react with the ceramic interface to form strong chemical bonds to improve adhesion of the membrane.

In the embodiment, because titanium and zirconium have the above characteristics, the first film 44 is made of titanium zirconium alloy. A thickness of the first film 44 can range from 0.5 μm to 5 μm. Proportion of zirconium in total mass can range from 30% to 70%.

Alternatively, the proportion of zirconium in the total mass can range from 40% to 60%.

In the embodiment, mass ratio of titanium to zirconium in the first film 44 may be 1:1.

The titanium zirconium alloy film made of titanium zirconium alloy itself is a local dense film. However, because the porous base 42 itself is an porous structure, the titanium zirconium alloy film formed on the surface of the porous base 42 also becomes a porous continuous structure, and the pore diameters of the titanium zirconium alloy film are slightly smaller than that of the porous base 42.

Furthermore, due to poor stability of the titanium zirconium alloy film in the air at high temperature, zirconium is easy to absorb hydrogen, nitrogen and oxygen, and the titanium zirconium alloy has a better air absorption. In the subsequent preparation of the electrodes of the atomizing component, because of the air absorption property of the titanium zirconium alloy, violent oxidation reactions will occur during high temperature sintering (above 300° C.), resulting in the resistance mutation of the first film 44. In order to avoid the contact between the first film 44 and the air, it is necessary to make a protective layer on the surface of the first film 44. The second film 46 can be used as the protective layer.

In other embodiments, when the porous base 42 is made of porous structural materials other than the porous ceramics, other porous structural materials can be used to make the first film 44, which is not specifically defined herein.

The material of the second film 46 can also be metal or alloy. In order to prevent an oxidation reaction between the first film 44 and the air from causing the resistance mutation, the second film 46 should be made of a material with strong antioxidant capacity. For example, the second film 46 may be selected from the group of platinum, palladium, palladium copper alloy, gold silver platinum alloy, gold silver alloy, palladium silver alloy, gold platinum alloy, and the like.

Due to poor compactness of the protective layer formed by silver and platinum, it is difficult to completely isolate the air. Although gold can protect the titanium zirconium alloy film well, on the one hand, resistance of the whole heating component will be greatly reduced due to the need of forming a dense protective layer with a thickness of about 100 nm or more. On the other hand, the cost is very high. Therefore, by using gold silver alloy in the embodiment, compactness of the gold protective layer is retained, and the cost is also reduced. Moreover, the resistivity of the gold silver alloy formed according to a certain proportion is increased by ten times, which is more conducive to controlling a resistance value of the whole heating component.

In the embodiment, a thickness of the second film 46 may range from 0.1 μm to 1 μm.

Alternatively, an atomic ratio of gold to silver can range from 30% to 70%.

Alternatively, the atomic ratio of gold to silver can range from 40% to 60%.

In the embodiment, the atomic ratio of gold to silver in the second film 46 is 1:1.

In the above embodiments, both the first film 44 and the second film 46 can be configured to generate heat to heat the e-liquid on the atomization surface 422. In other embodiments, only one covering film configured to generate heat or one main heating covering film can be provided. For example, only the first film 44 can be set to generate heat, and the second film 46 does not generate heat or generate significantly less heat than the first film 44. Alternatively, only the second film 46 can be set to generate heat, and the first film 44 does not generate heat or generate significantly less heating than the second film 46.

Specifically, in one embodiment, the first film 44 is provided for generating heat to heat and atomize the e-liquid on the atomization surface 422. The first film 44 is connected in parallel with the second film 46. Under these circumstances, a resistance value of the first film 44 is obviously smaller than that of the second film 46. The second film 46 formed on the surface of the first film 44 is mainly used as a protective film to protect the first film 44 and isolate the first film 44 from oxygen.

In the embodiment, the second film 46 can be made of gold silver alloy and other materials with strong antioxidant capacity. The present disclosure does not make specific limitations.

The material of the second film 46 can be conductive or non-conductive. When the second film 46 is made of a non-conductive material, an avoidance hole is also arranged on the second film 46. The electrode contacts the first film 44 through the avoidance hole and is electrically connected with the first film 44 to supply power for the first film 44 to generate heat.

Alternatively, the thickness of the first film 44 may range from 1 μm to 2 μm, and the thickness of the second film 46 may range from 0.1 μm to 0.2 μm. In the embodiment, the first film 44 can be the titanium zirconium alloy film, and the second film 46 can be the gold silver alloy film. For specific composition ratio of the titanium zirconium alloy film and the gold silver alloy film, the previous embodiments can be referred to. Alternatively, the resistance value of the first film 44 is less than 0.5 times that of the second film 46.

In another embodiment, the second film 46 is provided to generate heat to heat and atomize the e-liquid on the atomization surface 422. The first film 44 is connected in parallel with the second film 46. Under these circumstances, the resistance value of the second film 46 is far less than that of the first film 44. The first film 44 formed between the porous base 42 and the second film 46 is mainly used as a buffer film to enhance the adhesion between the second film 46 and the porous base 42 and prevent the second film 46 from falling off.

In the embodiment, the first film 44 can be made of titanium zirconium alloy and other materials with buffering capacity. The present disclosure does not make specific limitations.

The material of the first film 44 can be a conductive material or non-conductive material, and there is no specific limitation in the application.

Alternatively, the thickness of the first film 44 can range from 0.5 μm to 1 μm, and the thickness of the second film 46 can range from 0.3 μm to 1 μm. In the embodiment, the first film 44 can be the titanium zirconium alloy film, and the second film 46 can be the gold silver alloy film. For specific composition ratio of the titanium zirconium alloy film and the gold silver alloy film, the previous embodiments can be referred to. Alternatively, the resistance value of the second film 46 is less than 0.5 times that of the first film 44.

Further, as shown in FIG. 3, the atomizing component 40 further includes an electrode 41 formed on a side of the second film 46 away from the first film 44 for electrically connecting the first film 44 and/or the second film 46 with the power supply.

Metal materials with low resistivity, such as gold and silver, are generally selected for forming the electrode 41. There is no specific limitation in present disclosure. In the embodiment, silver is selected as the electrode 41. Silver not only has good conductivity, but also has relatively low cost.

In conclusion, it is easy for those skilled in the art to understand that in the atomizing component 40 of the present disclosure, the first film 44 and/or the second film 46 sequentially formed on the atomization surface 422 is adopted to generate heat and atomize the e-liquid on the atomization surface 422. Because the first film 44 and the second film 46 are evenly distributed on the atomization surface 422, the atomizing temperature of the e-liquid can be unified, and the smoke with the same size of atomized particles can be generated to improve the user's use effect.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. An atomizing component for an electronic cigarette, comprising: a porous base, a first film and a second film, wherein the porous base has an atomization surface, the first film and the second film are sequentially formed on the atomization surface, a resistance value of the second film is less than that of the first film, and at least one of the first film and the second film is configured to generate heat when charged to heat and atomize an e-liquid on the atomization surface.

2. The atomizing component according to claim 1, wherein a coefficient of thermal expansion of the second film is greater than a coefficient of thermal expansion of the first film, and the coefficient of thermal expansion of the first film is greater than a coefficient of thermal expansion of the porous base.

3. The atomizing component according to claim 1, wherein an antioxidant capacity of the second film is stronger than an antioxidant capacity of the first film.

4. The atomizing component according to claim 1, further comprising a thermal isolation layer formed between the first film and the porous base, wherein the thermal isolation layer is configured to protect the porous base.

5. The atomizing component according to claim 1, wherein the porous base is made of a conductive material, and the atomizing component further comprises an insulating layer formed between the first film and the porous base to insulate the porous base from the first film.

6. The atomizing component according to claim 1, wherein a porosity of the porous base ranges from 30% to 70%.

7. The atomizing component according to claim 1, wherein pore diameters of micropores on the porous base range from 1 μm to 100 μm.

8. The atomizing component according to claim 7, wherein a volume of micropores with pore diameters of 5-30 μm on the porous base accounts for more than 60% of a volume of all micropores on the porous base.

9. The atomizing component according to claim 1, wherein a material of the first film is titanium, zirconium, titanium aluminum alloy, titanium zirconium alloy, titanium molybdenum alloy, titanium niobium alloy, iron aluminum alloy or tantalum aluminum alloy.

10. The atomizing component according to claim 1, wherein the first film is made of titanium zirconium alloy, and a thickness of the first film ranges from 0.5 μm to 5 μm.

11. The atomizing component according to claim 10, wherein in the titanium zirconium alloy, proportion of zirconium in the total mass ranges from 30% to 70%.

12. The atomizing component according to claim 1, wherein a material of the second film is platinum, palladium, palladium copper alloy, gold silver platinum alloy, gold silver alloy, palladium silver alloy or gold platinum alloy.

13. The atomizing component according to claim 1, wherein the second film is made of gold silver alloy, and a thickness of the second film ranges from 0.1 μm to 1 μm.

14. The atomizing component according to claim 13, wherein in the gold silver alloy, an atomic ratio of gold to silver ranges from 30% to 70%.

15. The atomizing component according to claim 1, wherein a thickness of the first film ranges from 1 μm to 2 μm, and a thickness of the second film ranges from 0.1 μm to 0.2 μm.

16. The atomizing component according to claim 1, wherein a thickness of the first film ranges from 0.5 μm to 1 μm, and a thickness of the second film ranges from 0.3 μm to 1 μm.

17. The atomizing component according to claim 1, further comprising an electrode formed on a side of the second film away from the first film.

18. An atomizing component comprising:

a porous base having an atomization surface;

a first film formed on the atomization surface; and a second film formed on the first film;

wherein a resistance value of the second film is less than that of the first film, at least one of the first film and the second film is configured to generate heat when being charged.

19. An atomizing assembly of an electronic cigarette, comprising:

a liquid storage cavity for storing e-liquid; and an atomizing component; wherein the atomizing component comprises a porous base, a first film and a second film, the porous base has an atomization surface, the first film and the second film are sequentially formed on the atomization surface, and at least one of the first film, the second film is configured to generate heat when charged to heat and atomize an e-liquid on the atomization surface, and the e-liquid in the liquid storage cavity is capable of being transported to the atomization surface.

20. An electronic cigarette, comprising a battery assembly and an atomizing assembly, wherein the atomizing assembly of an electronic cigarette comprises a liquid storage cavity for storing e-liquid and an atomizing component; the atomizing component comprises a porous base, a first film and a second film, the porous base has an atomization surface, the first film and the second film are sequentially formed on the atomization surface, and at least one of the first film, the second film is configured to generate heat when charged to heat and atomize an e-liquid on the atomization surface, and the e-liquid in the liquid storage cavity is capable of being transported to the atomization surface; the battery assembly is electrically connected with the atomizing assembly to power the atomizing component of the atomizing assembly.

21. The atomizing component according to claim 18, further comprising a thermal isolation layer formed between the first film and the porous base, wherein the thermal isolation layer is configured to protect the porous base.

* * * * *